Jan. 14, 1964 E. DAMOND ETAL 3,117,641
WEIGHING APPARATUS

Filed May 24, 1961 4 Sheets-Sheet 2

Jan. 14, 1964   E. DAMOND ETAL   3,117,641
WEIGHING APPARATUS
Filed May 24, 1961   4 Sheets-Sheet 3

Inventors:
Emile Damond and
Aimé Celestin Polossak
by Michael S. Striker
Attorney FIG: 4
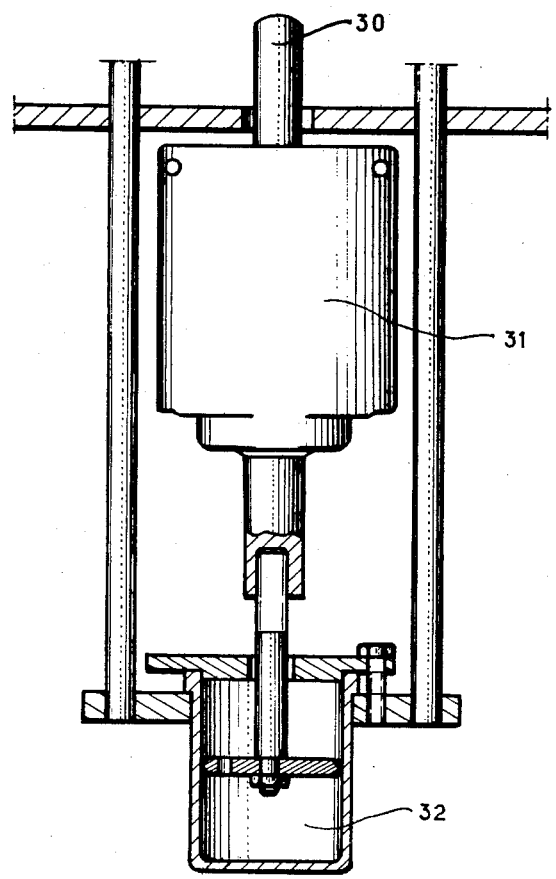

United States Patent Office 3,117,641
Patented Jan. 14, 1964

3,117,641
WEIGHING APPARATUS
Emile Damond, 26 Rue des Annelets, Paris, France, and Aimé Celestin Polossat, 15 Avenue du Maine, Gagny, France
Filed May 24, 1961, Ser. No. 112,465
Claims priority, application France May 25, 1960
11 Claims. (Cl. 177—235)

The present invention relates to a weighing apparatus of the kind having a beam with balancing weights, and more particularly to apparatus of this kind adapted for weighing at a receiving station during the course of loading, with a view to determining and, when so required, to control automatically the end of the loading operation corresponding to a pre-determined load registered on the weighing apparatus.

In apparatus of this type, the balancing weight is generally a slider placed in a determined position corresponding to the weight to be weighed. The adjustment of the position of this slider can only be carried out by hand, which is subject to a number of drawbacks. The adjustment takes a long time since, on the one hand, the essential parts of the weighing apparatus are frequently enclosed in a protective casing, and on the other hand, it must be carried out with great care. It is for this reason that in apparatus intended for cumulative weighing of different loads, a large number of beams are provided, balanced for the various successive loads and put into operation one after the other, so as not to vary the adjustment of the various beams except in the case where the value of one or more loads is required to be modified.

It has also been proposed to make the balancing weights, not in the form of one or more sliders, but in the form of weights intended to fall at pre-determined positions on the balanced arm, or again the weights may be arranged to roll to pre-determined positions on the beams. While these methods of balancing the beam are more appropriate to automatic remote control, they result however in a complicated operating equipment which is not particularly reliable.

The present invention is directed to a weighing apparatus of simple construction, of reliable operation and which lends itself readily to general control from a distance.

The weighing apparatus according to the invention is especially characterized in that it comprises a beam equipped with a set of balancing weights suspended from the said beam by flexible threads, the actual weight of which is negligible with respect to the weights which they respectively support, the whole set of the said weights producing a resultant moment on the beam which enables the beam to be balanced for the maximum normal load, and for each of the said weights, lifting means which render the said weight inoperative on the said beam.

The registration on the beam of a load to be weighed is thus simply effected by raising a certain number of weights which correspond to the difference between the normal load of the apparatus and the load to be weighed if all the weights are initially in the lower or active position, or by leaving suspended a number of weights which correspond to the load to be weighed, if all the weights are initially in the upper or inactive position.

The displacement of the weights can be effected by any appropriate means, mechanical, electrical or hydraulic, or in combination with these means, by the particular intermediary of a piston sliding in a cylinder which also serves as a vertical guide for a balancing weight. These means may be arranged in such manner as to put into operation the pre-determined combination of weights in order to obtain resultant forces on the beam varying by a unit of force corresponding to the smallest force liable to act on the beam, with a selector device ensuring the general control of the registration of the load to be weighed on the apparatus.

The particular features and advantages of the invention will further become apparent from the description which is given below by way of example, reference being made to the accompanying drawings, in which:

FIG. 4 is a view in elevation of an alternative form of construction of the device for controlling the positions of the weights.

Figure 1:
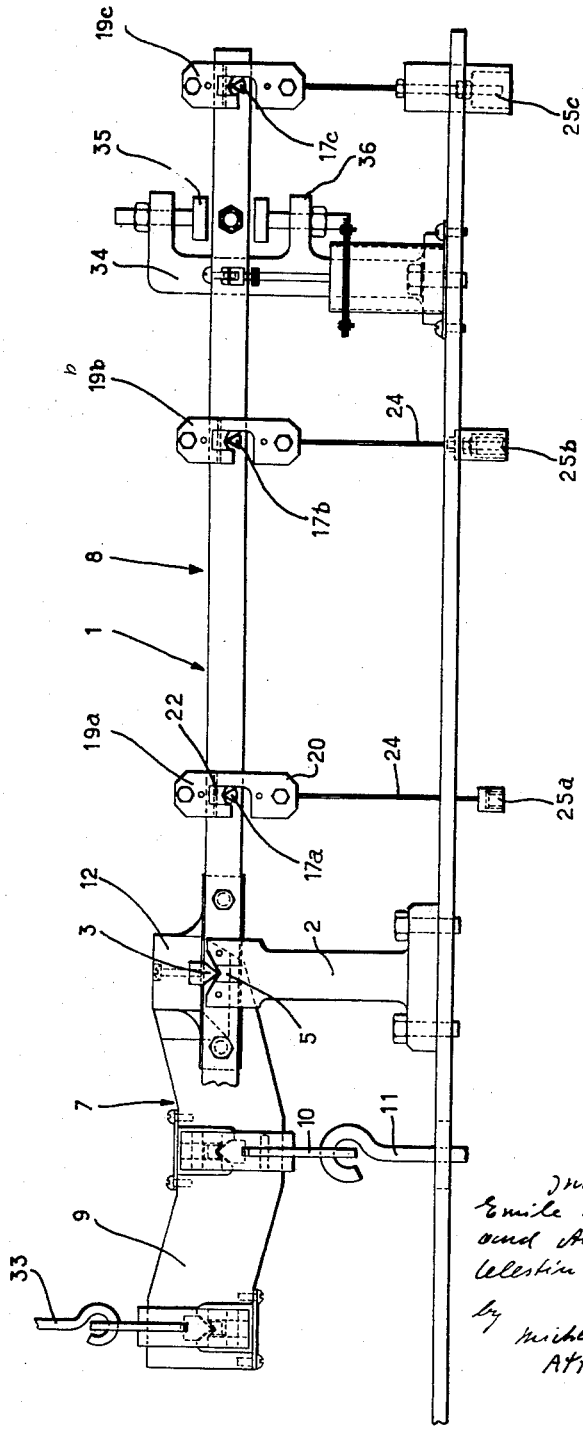
FIG. 1 is a view in elevation of a weighing apparatus in accordance with the invention.
Figure 2:
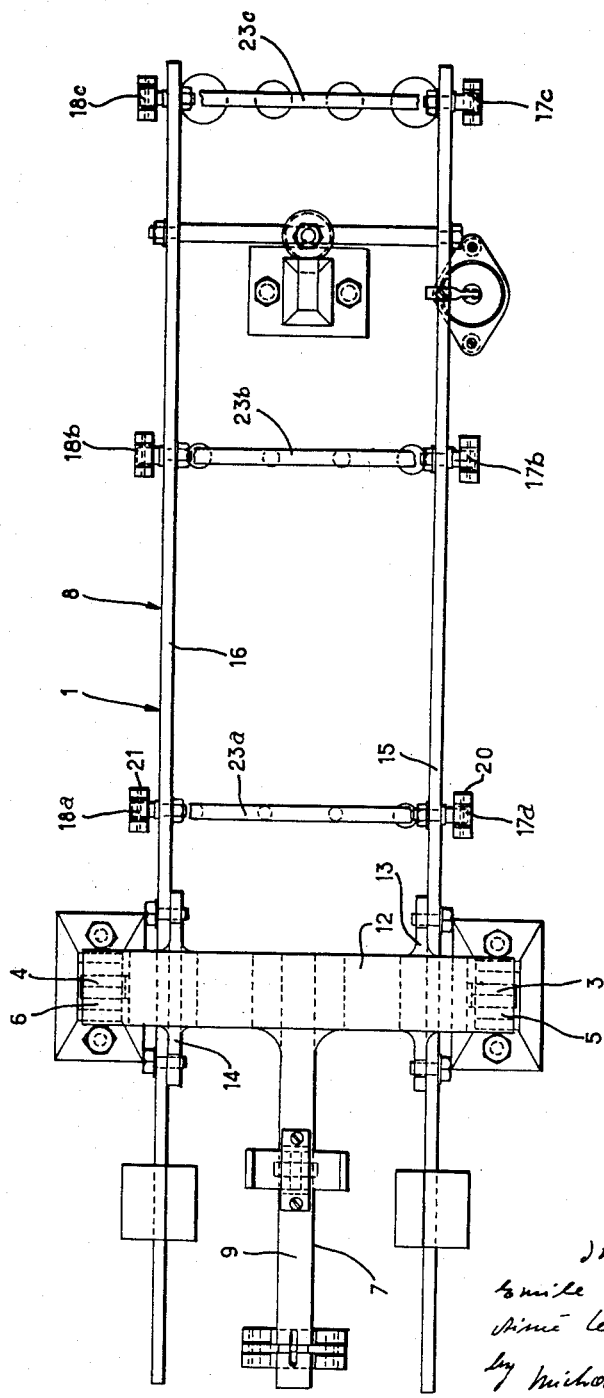
FIG. 2 is a plan view of the above weighing apparatus.

According to the form of construction selected and shown in FIGS. 1 and 2, a weighing device comprises essentially a beam 1 pivotally mounted on a support 2 by two knife-edges 3 and 4 arranged transversely in line and supported on the respective bearings 5 and 6. The beam 1 is thus composed of two arms 7 and 8, the arm 7 being that on which the load to be weighed acts—or a known proportion of this load when gearing-down means are provided—while the arm 8 is that on which act the balancing weights for the load to be weighed.

The arm 7 comprises a single limb 9, to which the load is fixed by means of a stirrup 10 and a hook 11, this limb 9 being followed at the position of the pivot by a transverse bar 12 provided with two flat end-plates 13 and 14, on which are bolted the bars 15 and 16 which form the arm 8 of the beam.

At three positions spaced longitudinally apart along the arm 8, the limbs 15 and 16 are provided with two lateral knife-edges referenced respectively 17 and 18 and having the suffixes $a$, $b$ and $c$, depending on their longitudinal positions.

Each of these pairs of knife-blades 17 and 18 carries a cradle 19 with the suffixes $a$, $b$ and $c$, depending on the longitudinal position, each cradle 19 being constituted by two stirrups 20 and 21 with a bearing 22 resting on a knife-edge 17 or 18 and coupled together by a transverse rod 23, with the suffixes $a$, $b$ or $c$, depending on the longitudinal position.

On each of the traverse rods $23a$, $23b$ or $23c$ are suspended by means of nylon threads 24, balancing weights $25a$, $25b$ or $25c$, for example four per rod.

The whole of the suspended weights 25 is such that it permits the application on the beam 1 of a resultant force capable of balancing the maximum normal load liable to act at 10 and 11 on the arm 7 of the beam 1 and also to permit, by the combinations made by eliminating certain of these weights, of covering the whole range of loads varying from zero to the said maximum load, by units of force corresponding to the smallest force capable of acting on the beam. Thus, for example, for a maximum normal load of 5 kgs., there could be provided:

In the position $a$, weights capable of counter-balancing a load of 10 grams, 10 grams, 5 grams and 25 grams respectively;

In the position $b$, weights equivalent to a load of 100 grams, 50 grams, 50 grams, 250 grams respectively;

In the position $c$, weights equivalent to loads of 1,000 grams, 500 grams, 500 grams, 2,500 grams.

As will be readily understood, by the successive application of the various combinations of weights, it is possible to counter-balance loads varying by 5 grams in stages between 0 and 5 kgs.

The elimination of a weight is effected by raising it, which renders it inoperative since the weight of the nylon threads is negligible with respect to the weights which they respectively carry.

In order to ensure the lifting of these weights, any appropriate means can be employed. There have been shown by way of example in FIGS. 3 and 4, two different means enabling this operation to be carried out.

Figure 3:
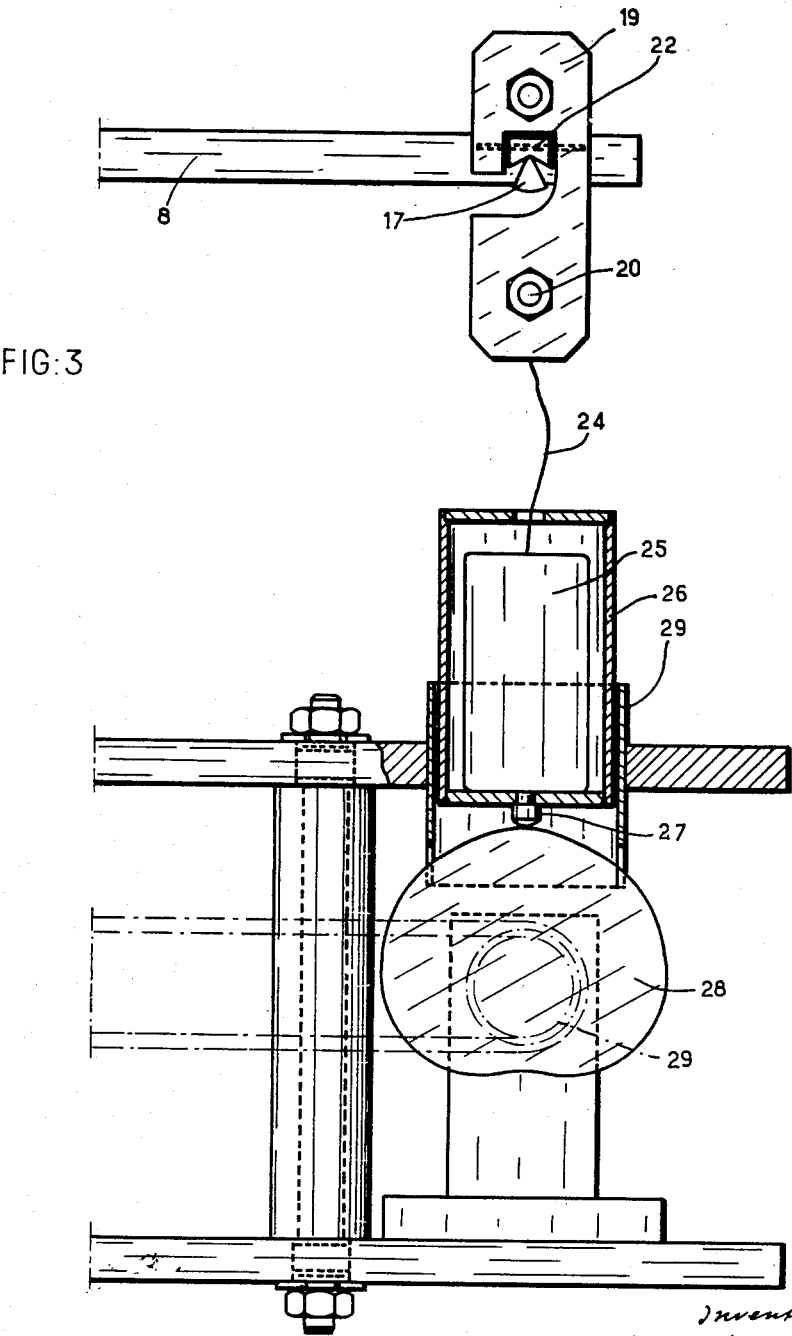
FIG. 3 is a view in elevation of a device for controlling the positions of the weights.

In FIG. 3, it can be seen that each weight 25 is located in a cylindrical casing 26 with an axial orifice at the top for the passage of the thread 24 and a lower finger 27 intended to co-operate with a cam 28. The casing 26 is guided for vertical sliding movement in a cylinder 29. In the position shown, the cam 28 lifts the weight 25, and renders it inoperative on the arm 8 of the beam, while a rotation of the cam through 180° frees the weight 25 and the latter becomes operative on the beam 8. Locking means are provided for the cam in the top and bottom positions of the push-casing 26.

The angular position of the cams is preferably effected by electrical means, for example all the cams 28 may be freely fixed on a shaft 29a in continuous rotation, each being associated with an electro-magnetic clutch (not shown), the excitation of which may be effected by selector means so as to cause the corresponding cam to rotate through 180°.

In FIG. 4, the vertically-sliding push member is a rod 30 actuated by an electro-magnet 31 associated with a dash-pot 32 so as to ensure a slow movement of the push member 30 and thus to avoid shocks on the balancing weight and also to prevent liability of oscillation. The choice of the excited relays for a load to be weighed is of course effected by appropriate selector means.

Referring again to FIGS. 1 and 2, it should be noted that the beam is coupled at 33 to an indicator adapted to check the load to be weighed accurately (or + and − indicators may be installed), together with a zero indicator. Also, the oscillation of the beam is limited by a device 34 with adjustable stops 35 and 36.

Note will also be made of the simplicity of the weighing apparatus described, and its adaptability to automatic remote control of the balancing weights, which amongst other things enables it to be employed with a single beam for weighing cumulative loads.

It will of course be understood that the invention is not limited to the forms of embodiment described and shown, and includes all its alternative forms. Thus for example, the balancing weights may be arranged on the beam on the same side as the load to be weighed, while the other arm of the beam carries a fixed weight which balances the normal load of the weighing apparatus. In the same way, the invention may be applied to the case of weighing apparatus with a number of beams, for example when it is desired to make up compositions, the formulae of which vary very frequently, the means for controlling the weights being capable of different arrangements which can be adapted to each particular case.

What we claim is:

1. Weighing apparatus of the kind comprising a beam; a set of balancing weights such that the moments of said weights on said beam permit the weighing of loads comprised between zero and the normal load of the apparatus by steps corresponding to the smallest moment acting on said beam and produced by a balancing weight; and means for selectively rendering said balancing weights operative or inoperative on said beam, said means comprising a flexible thread providing the suspension of each of said weights, the weight of said thread being negligible with respect to the weight suspended by said thread, and means for selectively lifting each of said weights from an operative position suspended on the thread to an inoperative position in which said thread is slackened.

2. Weighing apparatus as claimed in claim 1, in which said means for lifting a balancing weight comprise a push-member adapted to be displaced between a lower position in which said push member is spaced from the respective weight so that said weight is operative on said beam and a higher position in which said push member engages and lifts said weight so that the latter is inoperative on said beam and guide means for vertically guiding said weight during the movement thereof.

3. Weighing apparatus as claimed in claim 2, in which selector means are provided for controlling the position of each push member from a distance to effect the lifting of the weights which are to be rendered inoperative for a given load to be weighed.

4. Weighing apparatus as claimed in claim 2 and including a cam for each push member for moving the latter between said positions thereof.

5. Weighing apparatus as claimed in claim 4, in which said cams are freely mounted on rotating shafts and are each associated with an electro-magnetic clutch for coupling said cams to said shafts for rotation therewith, said clutches being controlled so as to effect angular rotation of a cam in such manner that said cam ensures the change in position of a push-member by said selector means.

6. Weighing apparatus as claimed in claim 3 and including an electro-magnet having a plunger core connected to said push member for controlling the position thereof, the excitation of said electro-magnet being controlled by said selector means.

7. Weighing apparatus as claimed in claim 1, in which a clamping device is connected to said weight-lifting means.

8. A weighing apparatus comprising, in combination, a beam; a set of balancing weights such that the moments of said weights on said beam permit the weighing of loads comprised between zero and a predetermined maximum load by steps corresponding to the smallest moment acting on said beam and produced by a balancing weight; suspension means for each of said weights for suspending each of the same at a selected position along said beam and comprising for each weight connecting means engaging said beam at the respective selected position, and a flexible thread extending between said connecting means and said weight for suspending the latter on said connecting means, the weight of said threads being negligible with respect to the weight suspended thereon; and means for selectively lifting each of said weights to slacken said threads to render thereby the lifted weight inoperative while leaving said connecting means in engagement with said beam.

9. A weighing apparatus as claimed in claim 8, in which said connecting means are formed from rigid material.

10. A weighing apparatus as claimed in claim 9, in which each of said connecting means are in the form of a cradle.

11. A weighing apparatus as claimed in claim 10, in which a plurality of knife edges are fixed to said beam at said selected positions thereof and in which said cradles are respectively balanced on said knife edges.

References Cited in the file of this patent

UNITED STATES PATENTS

| | | |
|---|---|---|
| 1,506,000 | Hapgood | Aug. 26, 1924 |
| 1,624,588 | Essmann | Apr. 12, 1927 |
| 2,066,762 | Bryce | Jan. 5, 1937 |